Patented May 14, 1940

2,200,756

UNITED STATES PATENT OFFICE 2,200,756

TREATMENT OF RUBBER

William E. Messer, Cheshire, and Henry H. Bassford, Jr., Naugatuck, Conn., assignors, by mesne assignments, to United States Rubber Company, New York, N. Y., a corporation of New Jersey No Drawing. Application September 2, 1937,
Serial No. 162,163

10 Claims. (Cl. 260—809)

This invention relates to the treatment of rubber and similar oxidizable materials, and more particularly to a new class of deterioration retarders.

An object of the invention is to provide a new class of anti-oxidants or age resisters for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, and the like. A further object of the invention is to provide chemicals which additionally act as flex-improvers or anti-flex cracking agents for vulcanized rubber such as tire treads, which undergo repeated strains during use. Another object is to provide anti-oxidants for rubber which do not bloom, activate, or retard the cure, or act as softeners or stiffeners.

According to the invention the organic substance is treated with a material which consists of a polymerized C-alkenyl substituted diarylamine, that is, where a carbon atom of at least one of the aryl groups is directly attached to an alkenyl group. These bodies are derived by first preparing the unpolymerized material and then polymerizing the same to a higher molecular resin-like state, whereby the unsaturation in the side chain is almost entirely destroyed, thereby producing resinous compounds having little or substantially no unsaturation in the side chain, as distinguished from the non-resinous unpolymerized original materials. The polymers are therefore more stable bodies, and better suited for storage, and processing in rubber. They are also less volatile and therefore less likely to be lost from the rubber during service or ageing.

Various methods of polymerization may be employed, among them being polymerization with a polymerization catalyst such as sodium, polymerization by heating to 260± ° C. for several hours, polymerization with acid such as hydrochloric acid in an organic solvent such as ether, at room temperatures, etc.

Examples of such materials are the following, in which X represents a multiple of 1 indicating a polymeric state:

Polymerized o-vinyl diphenylamine

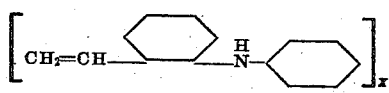

Polymerized p-vinyl diphenylamine

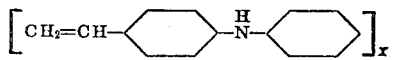

Polymerized vinyl phenyl beta-naphthylamine

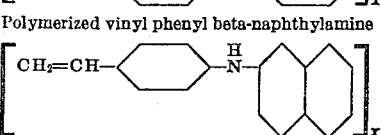

Polymerized o-ispropenyl diphenylamine

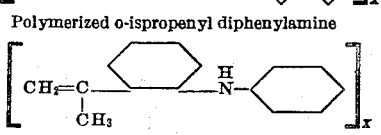

Polymerized p-isopropenyl diphenylamine

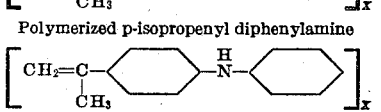

Polymerized isopropenyl phenyl beta-naphthylamine

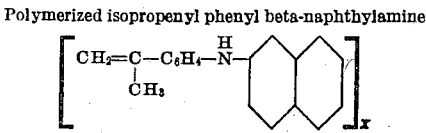

Polymerized p-anilino alpha isoamyl styrene

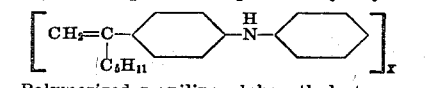

Polymerized p-anilino alpha ethyl styrene

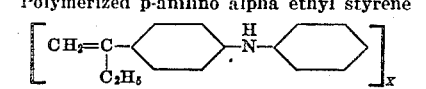

Polymerized 5-(p-xenyl-aminophenyl) 1,2,3,4-tetrahydro benzene

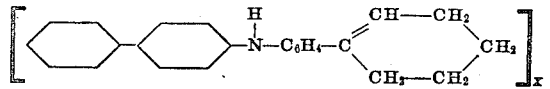

Polymerized N-phenyl-N'-p-isopropenyl phenyl p-phenylene diamine

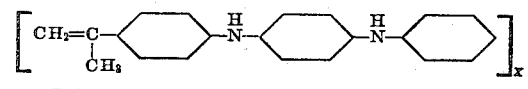

Polymerized isopropenyl phenyl amino biphenyl

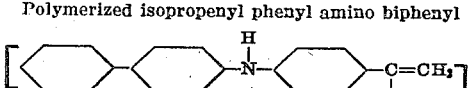

Polymerized 1,2 bis (p-anilido phenyl) ethylene, also called p,p'-dianilido stilbene

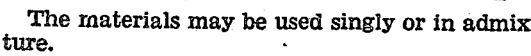

The materials may be used singly or in admixture.

Instead of having the alkenyl group joined to the carbon atom of only one aryl group, an alkenyl group may be joined to each of the aryl nuclei, as in di-isopropenyl diphenylamine, prior to polmerization. Further, if desired, the aryl groups may contain further substituents such as amino, arylamino, alkylamino, alkyl, alkoxy, hydroxy, etc.

The materials have special and outstanding properties in connection with the preservation of rubber and vulcanized rubber goods, and of which the following examples constitute preferred embodiments in illustration of the invention, the parts being by weight.

The cures are carried out at 30 pounds per sq. in. steam pressure for various intervals of time expressed below in minutes, and then subjected to testing for tensiles (T) expressed in lbs./sq. in., and Elongation (E) expressed in percent elongation, at break, both before and after ageing:

EXAMPLE 1

8 grams of p-isopropenyl diphenylamine are dissolved in 100 cc. ether and dry hydrochloric acid gas passed into the solution. A yellowish white to red precipitate forms. After saturation with HCl, the solution is allowed to stand for about 3 hours at the boiling point of ether. The solution is neutralized with alcoholic NaOH, diluted to dissolve the salt formed, cooled, and the solid filtered off, washed, dried and ground to desired size. The resinous material, HCl—polymerized p-isopropenyl diphenylamine, has a melting range of 64–87° C.±

| Stock tested | A (control) | D |
|---|---|---|
| Smoked sheets | 100 | 100 |
| Carbon black | 45 | 45 |
| Zinc oxide | 5 | 5 |
| Pine tar | 3.50 | 3.50 |
| Zinc soap of cocoanut oil fatty acids | 3.50 | 3.50 |
| Sulfur | 3.00 | 3.00 |
| Mercaptobenzothiazole | 1.00 | 1.00 |
| HCl-polymerized p-isopropenyl diphenylamine | | 1.00 |

Unaged

| Cure | A | | D | |
|---|---|---|---|---|
| | T | E | T | E |
| 45′/30# | 4630 | 690 | 4450 | 703 |
| 60′/30# | 4400 | 650 | 4430 | 690 |
| 75′/30# | 4360 | 646 | 4350 | 663 |
| 90′/30# | 4300 | 630 | 4300 | 646 |

Aged 96 hours in oxygen

| | T | E | T | E |
|---|---|---|---|---|
| 45′/30# | 1100 | 503 | 2200 | 613 |
| 60′/30# | 1100 | 460 | 2030 | 553 |
| 75′/30# | 1070 | 396 | 1960 | 500 |
| 90′/30# | 900 | 386 | 1700 | 500 |

Aged 96 hours in oven (212° F.)

| | T | E | T | E |
|---|---|---|---|---|
| 45′/30# | 1600 | 233 | 3000 | 423 |
| 60′/30# | 1400 | 213 | 3040 | 413 |
| 75′/30# | 1500 | 223 | 2550 | 346 |
| 90′/30# | 1620 | 220 | 2630 | 346 |

EXAMPLE 2

8 grams of p-isopropenyl diphenylamine are heated to 250° C.± for about 2 hrs., and then about 1 hr. at 310–360° C. The resulting heat-polymerized p-isopropenyl diphenylamine is a brown hard resin melting from 74–120° C., and boiling about 260° C. at 2.5 ± mm. mercury pressure.

| Stock tested | A (control) | E |
|---|---|---|
| Smoked sheets | 100 | 100 |
| Carbon black | 45 | 45 |
| Zinc oxide | 5 | 5 |
| Pine tar | 3.50 | 3.50 |
| Zinc soap of cocoanut oil acids | 3.50 | 3.50 |
| Sulfur | 3.00 | 3.00 |
| Mercaptobenzothiazole | 1.00 | 1.00 |
| Heat polymerized p-isopropenyl D—P—A | | 1.00 |

Unaged

| Cure | A | | E | |
|---|---|---|---|---|
| | T | E | T | E |
| 45′/30# | 4230 | 690 | 4280 | 703 |
| 60′/30# | 4300 | 676 | 4240 | 666 |
| 75′/30# | 4300 | 663 | 4330 | 663 |
| 90′/30# | 4240 | 643 | 4240 | 646 |

Aged 96 hours in oxygen

| | T | E | T | E |
|---|---|---|---|---|
| 45′/30# | 1200 | 486 | 2300 | 620 |
| 60′/30# | 1200 | 463 | 2200 | 526 |
| 75′/30# | 1050 | 426 | 1980 | 516 |
| 90′/30# | 940 | 406 | 1980 | 516 |

Aged 96 hours in oven (212° F.)

| | T | E | T | E |
|---|---|---|---|---|
| 45′/30# | 1400 | 220 | 2270 | 306 |
| 60′/30# | 1840 | 240 | 1740 | 240 |
| 75′/30# | 1340 | 200 | 2500 | 313 |
| 90′/30# | 1600 | 213 | 2240 | 290 |

Where the term "rubber" is used herein it is to be construed broadly as including caoutchouc, balata, gutta percha, and similar vulcanizable gums, as well as synthetic rubbers, rubber isomers, reclaimed rubber, etc., and natural or artificially-prepared latices.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described our invention, what we claim and desire to protect by Letters Patent is:

1. A method of preserving organic substances which tend to deteriorate by absorption of oxygen from the air which comprises incorporating therein an anti-oxidant consisting of a polymeric C-alkenyl substituted diarylamine.

2. A method of preserving organic substances which tend to deteriorate by absorption of oxygen from the air which comprises incorporating therein an anti-oxidant consisting of a resinous polymer of a diarylamine compound in which at least one of the aryl groups is directly attached to an alkenyl radical.

3. A method of preserving organic substances which tend to deteriorate by absorption of oxygen from the air which comprises incorporating therein an anti-oxidant consisting of a polymerized p-isopropenyl diarylamine.

4. A method of preserving organic substances which tend to deteriorate by absorption of oxygen from the air which comprises incorporating therein an anti-oxidant consisting of polymerized p-isopropenyl diphenylamine.

5. A method of preserving organic substances which tend to deteriorate by absorption of oxygen from the air which comprises incorporating therein an anti-oxidant consisting of a polymerized C-isopropenyl substituted phenyl beta naphthylamine.

6. A rubber product containing an anti-oxidant consisting of a polymeric C-alkenyl substituted diarylamine.

7. An organic substance which tends to deteriorate by absorption of oxygen from the air containing an anti-oxidant consisting of a resinous polymer of a diarylamine compound in which at least one of the aryl groups is directly attached to an alkenyl radical.

8. An organic substance which tends to deteriorate by absorption of oxygen from the air containing an anti-oxidant consisting of a polymerized p-isopropenyl diarylamine.

9. An organic substance which tends to deteriorate by absorption of oxygen from the air containing an anti-oxidant consisting of polymerized p-isopropenyl diphenylamine.

10. An organic substance which tends to deteriorate by absorption of oxygen from the air containing an anti-oxidant consisting of a polymerized C-isopropenyl substituted phenyl beta naphthylamine.

WILLIAM E. MESSER.
HENRY H. BASSFORD, Jr.